2,744,233

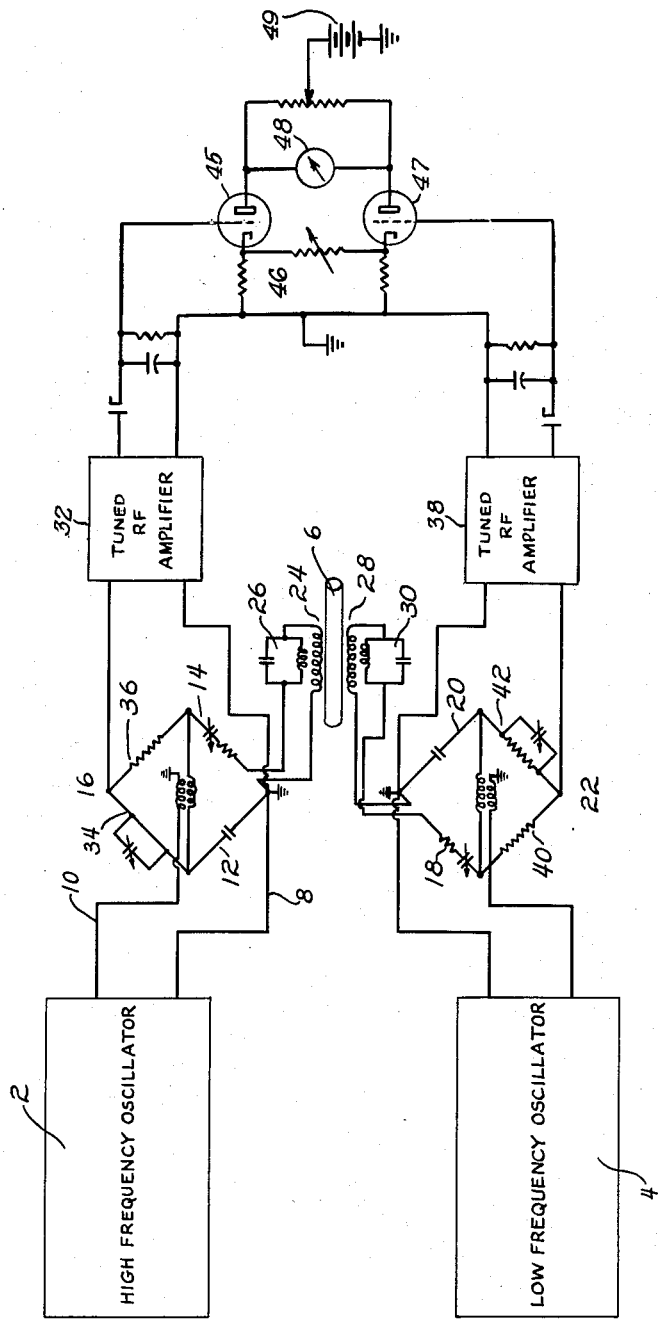

APPARATUS FOR DETECTING FLAWS IN METAL STOCK

John O. Paivinen, Aldan, Pa., assignor to Associated Spring Corporation, Bristol, Conn., a corporation of Delaware Application May 26, 1952, Serial No. 290,062

3 Claims. (Cl. 324—34)

This invention relates broadly to the testing of metal to detect flaws and, more particularly, to the testing of metallic articles of elongated structural shape such as wire, bars, rods, tubes and the like to detect the presence of cracks, seams and the like. Testing apparatus for this purpose is now well known and, in general, operates by inducing eddy currents in the stock and providing an indication of any variation in the reaction offered by the test sample to the solenoid which induces the currents, which variation will indicate the presence of a crack, seam or other flaw.

In such known systems an electromagnetic field of only a single frequency is used to induce the eddy currents in the stock. It has been found that one disadvantage of such single-frequency systems is that they are affected by changes in the diameter and physical properties of the material of the stock, thus producing the indication of a defect when none exists. It has been a principal object of my invention to provide a method and apparatus for flaw detection which is not responsive to variations in the diameter and material properties of the stock and which is made operative to produce an indication only by the presence of a flaw in the stock.

In general, this is accomplished by the invention by simultaneously subjecting the test stock to two electromagnetic fields which are affected similarly by the physical and chemical properties of the stock but dissimilarly by cracks, seams and other flaws. This may be done by simultaneously subjecting the stock to electromagnetic fields of high and low radio frequency which respectively induce in the stock eddy currents within the outer surface zone of the stock and eddy currents which penetrate the stock to greater depth. The reaction of the stock to each of these eddy currents may be measured, and, if the sample is homogeneous throughout the part thereof in which eddy currents flow, the impedance "seen" by the two frequency channels will vary in a similar manner with the conductivity and other physical properties of the stock and will be proportional to the square root of the frequencies. A sample having a crack, seam or other flaw may not be considered homogeneous as the flaw decreases the conductivity by interposing a barrier into the path of current flow. Since the eddy currents are of different depths in the ratio of the square roots of the two frequencies the admittance of the two channels will be different and, in particular, the admittance for the shallower current will be lower than for the deeper current as a greater portion of the current path of the shallower current is interrupted by the flaw. Therefore, the output voltages of the high and low frequency channels, which are adjusted to balanced condition for a flawless sample, will differ in magnitude for flawed samples and the presence of a flaw may be determined by observing a difference in the output voltages or by noting a predetermined ratio of output voltages.

The single figure of the drawing is a circuit diagram showing one form of the invention.

In the disclosed embodiment of the invention there are provided a source 2 of high radio frequency energy and a source 4 of low radio frequency energy. The frequency of oscillator 2 is chosen that the high frequency voltage induces eddy currents predominantly in the outer surface zone of a piece of stock 6 which is being tested for flaws, while the frequency of oscillator 4 is so chosen that the low frequency induces eddy currents which penetrate the stock to a greater depth. I have found that such eddy currents may be produced by a high radio frequency in the range of 1 to 2 megacycles per second and a low radio frequency of 200 kilocycles per second, although other frequencies may be used. The output of high frequency oscillator 2 is connected through leads 8, 10, across two arms 12, 14 of a radio frequency bridge 16, while the output of the low frequency oscillator 4 is connected similarly across arms 18, 20 of a radio frequency bridge 22. The unknown element of bridge 16 is an indication coil 24 which is connected in series in bridge arm 14 and in this series connection there is included a parallel tank circuit 26 which is resonant to the frequency of the low frequency oscillator. The unknown element of bridge 22 is an induction coil 28 which is connected in series in bridge arm 18 and in this series connection there is included a parallel tank circuit 30 which is resonant to the frequency of the high frequency oscillator. The two coils 24, 28 are co-axially wound to provide a passage through which the elongated stock 6 which is being tested may be passed so that successive increments of its length will be subjected to the electromagnetic fields of coils 24, 28. The output of the high frequency bridge 16 is connected to a radio frequency amplifier 32, the connection of one output lead being made to the bridge at the terminal connecting arms 12, 14 and the connection of the other output lead being made at the terminal connecting the two other arms 34, 36 of the bridge. The output of the low frequency bridge 22 is connected to a second radio frequency amplifier 38, the connection of one ouput lead being made to the bridge at the terminal connecting arms 18, 20 and the connection of the other output lead being made at the terminal connecting the two other arms 40, 42 of the bridge. One output terminal of each of the radio frequency amplifiers is grounded at 44, while the others are connected to the opposite terminals of a difference detector circuit 46, the output of which is indicated on meter 48.

In the use and operation of the described system, a homogeneous sample 6 of wire, rod or other stock is inserted in the passage formed and surrounded by coils 24, 28, the bridges 16, 22 are adjusted for minimum output voltage into the respective radio frequency amplifiers 32, 38 to which they are connected, and the resistances R1 and R2 of the difference detector circuit 46 are adjusted until the meter 48 reads zero. It will be apparent that as the high and low frequency sides of the system are testing the stock at the same part, i. e. that part of the stock within the coils 24, 28, any variation in the physical or chemical properties of the stock will have the same effect on the high and low frequency bridges and these effects will therefore cancel each other in the difference detector circuit. A second homogeneous sample having physical or chemical properties different from those of the first homogeneous sample is now inserted in the test head in place of the first homogeneous sample, causing unbalance of both channels, and the gains of the two radio frequency amplifiers are again adjusted to obtain a null indication at the difference detector. If a sample having a seam, crack or other flaw is now inserted in the test head passage there will be a greater imbalance in the high frequency bridge than in the low frequency bridge because of the fact, as stated hereinbefore, that the high frequency induces eddy currents predominantly in a shallow zone at and adjacent the surface of the stock while the eddy currents induced by the low frequency penetrate the stock to a greater depth at which the crack or seam does not exist or is of less extent than in the surface zone.

The output terminals of each of the radio frequency amplifiers are connected across the grid and cathode of one of two vacuum tubes 45, 47 which are supplied with plate potential by source 49 and which are connected in a difference detector circuit 46, the output of which is indicated on meter 48.

In order to eliminate the effect of coupling between the coils 24, 28 and to increase to a maximum the sensitivity of the high frequency bridge 16 to any change due to a flaw in the wire sample, it is necessary to prevent the impedance of the low frequency bridge from being "seen" by the high frequency bridge. This is accomplished by the parallel tank circuit 30 which is connected in series with the low frequency test coil 28 and is resonant to the frequency of the high frequency bridge. This tank circuit eliminates the effect of the low frequency branch of the system and accordingly the high frequency bridge "sees" only the test stock 6. Similarly, in order to make the sensitivity of the high frequency branch of the system a maximum, it is necessary to prevent the impedance of the high frequency bridge from being "seen" by the low frequency bridge and this is accomplished by the parallel tank circuit 26 which, as stated, is connected in series with the high frequency coil 24 and is resonant to the frequency of the low frequency bridge. This causes the low frequency branch to disappear so that the high frequency bridge "sees" only the test sample.

It will be understood that the disclosed embodiment is only illustrative of the invention and that other embodiments, as well as modifications of that disclosed, may be made and practiced without departing from the scope of the invention, for the limits of which reference must be made to the appended claims.

What is claimed is:

1. Apparatus for indicating the presence of physical defects in elongated metallic stock such as wire, bars, tubes and the like, comprising a source of high radio frequency energy, a source of lower radio frequency energy, two radio frequency bridges respectively connected across the outputs of said sources, two concentric cylindrical induction coils each connected in an arm of one of the bridges and defining an open passage through which the stock may be passed, a parallel tank circuit connected in series with the high frequency coil and tuned to resonance with the low radio frequency, a parallel tank circuit connected in series with the low frequency coil and tuned to resonance with the high radio frequency, means for amplifying the output of each of the bridges, a difference detector circuit connected to said amplifiers and including means for adjusting the amplified currents, and means for indicating any difference between the amplified currents.

2. Apparatus for continuously indicating the presence of physical defects in moving elongated electrically conducting metallic stock such as wire, bars, tubes and the like, comprising a source of high radio frequency energy and a source of low radio frequency energy, two radio frequency bridges connected respectively across the outputs of said sources of energy, two induction coils each connected in an arm of one of said bridges and arranged concentrically to provide a space through which the metallic stock is moved to produce eddy currents therein in a first zone at and adjacent the surface of the stock and other eddy currents at a greater depth within the stock, means for adjusting said fields when inducing eddy currents in flawless stock, and means for indicating any unbalance of the eddy currents due to a flaw in the stock.

3. Apparatus according to claim 2 comprising in addition a parallel tank circuit connected in series with the high frequency coil and which is resonant with the low radio frequency, and a parallel tank circuit connected in series with the low frequency coil and which is resonant with the high radio frequency.

References Cited in the file of this patent

UNITED STATES PATENTS

| | | |
|---|---|---|
| 2,258,837 | Zuschlag | Oct. 14, 1941 |
| 2,337,231 | Cloud | Dec. 21, 1943 |
| 2,435,985 | Stewart, et al. | Feb. 17, 1948 |
| 2,572,908 | Brenholdt | Oct. 30, 1951 |
| 2,595,380 | Hudson | May 6, 1952 |